United States Patent [19]
Mügge et al.

[11] Patent Number: 5,378,769
[45] Date of Patent: Jan. 3, 1995

[54] MOLDING COMPOSITIONS CONTAINING A POLYCONDENSATION PRODUCT OF A POLYAMIDE, A POLYESTER AND A COMPATIBILIZER

[75] Inventors: Joachim Mügge, Haltern; Friedrich Sosna, Dorsten, both of Germany

[73] Assignee: Hüls Aktiengesellschaft, Marl, Germany

[21] Appl. No.: 928,453

[22] Filed: Aug. 12, 1992

[30] Foreign Application Priority Data

Nov. 14, 1991 [DE] Germany ............................ 4137432
Nov. 23, 1991 [DE] Germany ............................ 4138510

[51] Int. Cl.$^6$ ...................... C08L 67/02; C08L 77/00; C08L 77/12
[52] U.S. Cl. ..................................... 525/425; 525/434
[58] Field of Search ....................... 525/425, 434, 432

[56] References Cited

U.S. PATENT DOCUMENTS 4,837,115  6/1989  Igarashi et al. .................. 428/36.92
4,957,980  9/1980  Kobayashi et al. ................ 525/425

Primary Examiner—Ana L. Carrillo
Attorney, Agent, or Firm—Oblon, Spivak, McClelland, Maier, & Neustadt

[57] ABSTRACT

A molding composition is provided which is effective as an agent for imparting compatibility in thermoplastic blends or as an adhesion-promoting layer in composite materials which comprises:
A. a polyamide
B. a polyester, and
C. an oxazoline derivative.

8 Claims, No Drawings

MOLDING COMPOSITIONS CONTAINING A POLYCONDENSATION PRODUCT OF A POLYAMIDE, A POLYESTER AND A COMPATIBILIZER

BACKGROUND OF THE INVENTION

The present invention relates to molding compositions containing a polycondensation product of a polyamide, a polyester and a specific compatibility and adhesion promoter.

Multilayer composites consisting of polyamides and either polyesters or polycarbonates are of great practical, commercial and scientific interest since these materials have characteristics which cannot be achieved with a single thermoplastic resin. Distinctly improved characteristics such as lower water absorption, improved resistance to stress cracking, a high degree of toughness and good dimensional stability can be obtained with blends of polyamides and polyesters and with blends of polyamides and polycarbonates which are otherwise unattainable. However, polyamides are, as a rule, not miscible with polyesters or polycarbonates. Therefore, suitable agents for imparting compatibility or for promoting adhesion must be used in blends and in multilayer composites containing these resins.

Blends of polyamides with polyesters or polycarbonates containing agents for imparting compatibility have already been described: specific amorphous polyamides (U.S. Pat. No. 4,798,874), malemide copolymers (EP-A-361 230), high molecular weight epoxy compounds (German Offenlegungsschrift 3,833,286), styrene copolymers (German Offenlegungsschrift 3,832,849) or hydroxyl group-containing polymers (German offenlegungsschriften 3,641,499 and 3,605,573). Random copolycondensation products of polyamides and polyesters are disclosed in U.S. Pat. No. 4,788,249 which are prepared from the monomers and cannot be produced by simple melt-mixing of the polycondensation product components. Moreover, the producibility of the copolycondensation products is restricted to specific systems.

Copolycondensation products of polyamides and polyesters are described in U.S. Pat. No. 4,417,031. Here, polyamides and polyesters are mixed in the melt phase with the addition of one or more phosphite catalysts. In WO 90/12836 aryl phosphoryl azides are described as catalysts for improving the compatibility between polyamides and polyesters. A disadvantage of this process, however, is that the catalyst remains in the composition and is the cause of further uncontrollable reactions, such as the increase or decrease in molecular weight or the accelerated degradation by hydrolysis during processing.

SUMMARY OF THE PRESENT INVENTION

One of the objects of the present invention is to develop a molding composition which is a suitable as an agent for imparting compatibility and promoting adhesion and which avoids the described disadvantages of the prior art.

These objects are achieved by providing molding compositions containing a polycondensation product of:
A. 0.9 to 99% by weight of a polyamide
B. 99 to 0.9% by weight of a linear, crystalline polyester and
C. 0.1 to 10% by weight of a compound of the general formula (A)

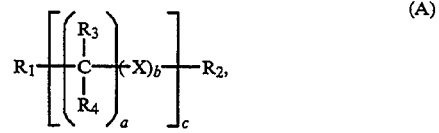

in which $R_1$ and $R_2$ denote:

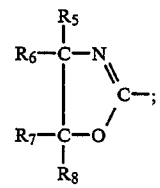

$R_3$ to $R_8$ denote —H or an aliphatic or cycloaliphatic $C_{1-12}$ radical, it being possible for $R_3$ to $R_8$ to be identical to or different from one another;
x denotes an aromatic $C_{6-12}$ diradical or a cycloaliphatic $C_{3-12}$ diradical,
a denotes 0 to 12;
b denotes 0 or 1 and
c denotes 0 or 1.

Polyamides (Component A) which can be used in the present invention include aliphatic homo- and copolycondensation products, examples of which are 4,6-, 6,6-, 6,12-, 8,10- and 10,10-polyamides or the like. 6-, 10,12-, 11-, 12- and 12,12-polyamides are preferred where the first number or numbers indicate the number of C atoms in the diamine component of the polyamide and the last number or numbers indicate the number of C atoms in the dicarboxylic acid component of the polyamide. If only one figure is mentioned, this signifies that an alpha, omega-amino-carboxylic acid or the lactim derived therefrom has been used as the starting material: see H. Domininghaus, "Die Kunststoffe und ihre Eigenschaften" ("Plastics and their Characteristics"), page 272, VDI-Verlag (1976).

If copolyamides are used, these can contain adipic acid, sebacic acid, suberic acid, among others, isophthalic acid or terephthalic acid, as co-acid, and bis(4'-aminocyclohexyl)methane, trimethylhexamethylenediamine, hexamethylenediamine or similar codiamines. The preparation of these polyamides is known (see for example, D. B. Jacobs, J. Zimmerman, Polymerization Processes, pp. 424–67; Interscience Publishers, New York (1977); German Auslegeschrift 21,52,194).

Other suitable polyamides are mixed aliphatic-/aromatic polycondensation products such as those described in, for example, U.S. Pat. Nos. 2,071,250; 2,071,251; 2,130,523; 2,130,948; 2,241,322; 2,312,966; 2,512,606; and 3,393,210 incorporated herein by reference and in Kirk-Othmer, Encyclopedia of Chemical Technology, Wiley & Sons (1982) 3rd Edition, Vol. 18, pages 328 and 435. Further polycondensation products suitable as polyamides are poly(ether esteramides) or poly(ether amides). Products of this type are mentioned, for example, in German Offenlegungsschriften 27,12,987, 25,23,991 and 30,06,961.

The number-average molecular weight of the polyamides useful in the present invention is preferably above 5,000, more preferably above 10,000 corresponding to a relative viscosity ($\eta_{rel}$) in the range of 1.5 to 2.8 and may be used alone or as mixtures. Polyamides (Component A) in which at least 50%, preferably 70%, of all end groups present in the polyamide are amino groups are particularly suitable.

The linear, crystalline polyesters (Component B) preferably have the following basic structure:

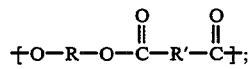

where R represents a divalent, branched or non-branched aliphatic and/or cycloaliphatic radical having 2 to 12, preferably 2 to 8, C atoms and R' represents a divalent aromatic radical having 6 to 20, preferably 8 to 12, C atoms in its carbon skeleton.

Examples of diols which may be used to produce the above polyesters are ethylene glycol, trimethylene glycol, tetramethylene glycol, hexamethylene glycol, neopentyl glycol, cyclohexanedimethanol and the like. If a mixture of diols is used, up to 25 mol % of the diol above can be replaced by a second diol, already mentioned above, or by a diol having the following general formula

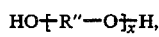

where R" denotes a divalent radical having 2 to 4 C atoms where x can be a number of from 2 to 50. Preferable diols are ethylene glycol and tetramethylene glycol.

Aromatic dicarboxylic acids which can be used to produce the Component B polyester are, for example, terephthalic acid, isophthalic acid, 1,4-, 1,5-, 2,6- and 2,7-naphthalenedicarboxylic acid, diphenic acid and (diphenyl ether)-4,4'-dicarboxylic acid. Up to 20 mol % of these dicarboxylic acids can be replaced by aliphatic dicarboxylic acids, such as succinic acid, maleic acid, fumaric acid, sebacic acid, dodecanedioic acid and others. In particular, Component B polyesters in which at least 50%, preferably 70%, of all end groups present in the polyester represent carboxyl end groups and which have a coefficient of viscosity (J value) in the range of 80 to 240 cm³/g are preferred.

The preparation of the linear, crystalline polyesters is known in the art: German offenlegungsschriften 24,07,155 and 24 07 156; Ullmanns Encyclopaedie der technischen Chemie, (Ullmans Encyclopaedia of Industrial Chemistry), Verlag Chemie GmbH, Weinheim (1980), 4th Edition, Vol. 19, page 65 et seq.

The polyamides (Component A) and/or the linear, crystalline polyesters (Component B) can contain up to 40% by weight of other thermoplastics, insofar as these do not disrupt the fundamentally required characteristics of the composition. Such thermoplastics include polycarbonates (H. Schnell, Chemistry and Physics of Polycarbonates, Interscience Publishers, New York 1981), acrylonitrile/styrene/butadiene/copolymers (Houben-Weyl), Methoden der organischen Chemie, (Methods of Organic Chemistry), Vol. 14/1, Georg Thieme Verlag Stuttgart, pp. 393–406; Ullmanns Encyclopaedie der technischen Chemie (Ullmanns Encyclopedia of Industrial Chemistry), 4th Edition, Vol. 19, Verlag Chemie Weinheim (1981), pp. 279–284), acrylonitrile/styrene/acrylate copolymers (Ullmanns Encyclopaedie der technischen Chemie, 4th Edition, Vol. 19, Verlag Chemie Weinheim (1981), pp. 277–295), acrylonitrile/styrene copolymers (Ullmanns Ency-clopaedie der technischen Chemie (Ullmanns Encyclopedia of Industrial Chemistry), 4th Edition, Vol. 19, Verlag Chemie Weinheim (1981), p. 273 et seq.) or polyphenylene ethers (German Offenlegungsschriften 32,24,691 and 32,24,692, U.S. Pat. Nos. 3,306,874, 3,306,875 and 4,028,341).

Component C is a compound of the general formula (A)

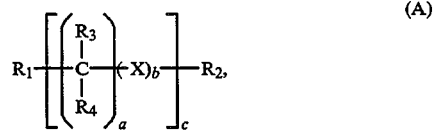

in which $R_1$ and $R_2$ denote:

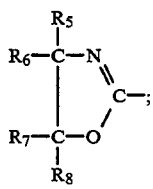

$R_3$ to $R_8$ denote —H or an aliphatic or cycloaliphatic $C_1$–$C_{12}$ radical, X denotes an aromatic $C_6$–$C_{12}$ diradical or cycloaliphatic $C_{3-12}$ diradical and a denotes a number from 0 to 12 and b and c denote 0 or 1. The various substituents $R_1$–$R_8$, x and a, b and c can be identical or different.

Preferred Component C compounds are those in which, in the general formula (A), $R_1$ and $R_2$ are identical and a=0, b=c=1,

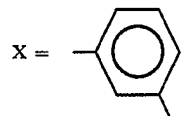

and $R_3$ to $R_8$=—H, or a=6, b=0, c=1 and $R_3$ to $R_8$=—H, or a=0, b=c=1,

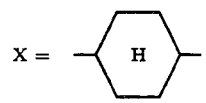

and $R_3$ to $R_8$=—H.

Particularly preferred Component C compounds are, for example, 2,2'-methylene-bis(2-oxazoline), 2,2'-ethylene-bis(2-oxazoline), 2,2'-hexamethylene-bis(2-oxazoline), 2,2'-methylene-bis(2-oxazoline), 2,2'-p-phenylene-bis-(2-oxazoline), 2,2'-m-phenylene-bis-(2-oxazoline) and 1,4-cyclohexylidene-bis-(2-oxazoline). The Component C compounds can be used on their own or as a mixture.

The polycondensation products contained in the molding compositions according to the invention are as follows:

A. 0.9 to 99% by weight of polyamide,
B. 99 to 0.9% by weight of linear, crystalline polyester and
C. 0.1 to 10% by weight of a compound of the general formula (A).

A preferred polycondensation product consists of

A. 29.5 to 70% by weight of polyamide,

B. 70 to 29.5% by weight of linear, crystalline polyester and

C. 0.5 to 5% by weight of a compound of the general formula (A)

For the preparation of the polycondensation products it has proven advantageous—although not necessary—to choose the starting ratio of Components A, B, and C such that the end groups of the components vary within the following ranges:

alpha : beta=0.5 to 2.0 beta : gamma=0.8 to 2.0

In this context, alpha denotes the $NH_2$ end group concentration in mmol/kg of polyamide multiplied by the proportion by weight (expressed as % by weight) of Component A, beta denotes the COOH end group concentration in mmol/kg of polyester multiplied by the proportion by weight (expressed in % by weight) of Component B, and gamma denotes the reciprocal molecular weight of Component C multiplied by the proportion by weight (expressed in % by weight) of Component C.

The preparation of the molding compositions according to the invention takes place in the melt, preferably in a continuous kneading unit, such as a twin-screw extruder, etc., in such a way that the polyamide component and the polyester component, with the addition of an adequate amount of Component C, are intimately mixed in the melt at high shear rates and at temperatures between 200° and 350° C. The lower limit for the operating temperature is given by the melting point of the component having the higher melting point and the upper temperature limit is given by decomposition and degradation reactions which may possibly occur. As a rule, it will prove to be more advantageous to keep the mass temperature of the melt close to the upper temperature limit. In order to remove volatile products which occur, it is advantageous to degas the melt by applying a reduced pressure.

The sequence of metering of Components A, B and C into the mix is arbitrary, but a procedure is preferred in which one of Components A and B is first melted with Component C, and this mixture is then melt-mixed with the remaining component. This can take place in one or two extrusion steps, the second component being metered in downstream. A particularly preferred process is one in which the polyester component is first melted with Component C and this mixture is then melt-mixed with the polyamide component.

If necessary, the polycondensation products of the present invention can be formulated so that they are impact resistant. Suitable additive polymers are, for example, ethylene/propylene or ethylene/propylene/diene copolymers (EP-A-295 076), polypentenylene, polyoctenylene or copolymers of random or block structure composed of alkenylaromatic compounds with aliphatic olefins or dienes (EP-A-261 748). Rubbers which impart impact resistance may also be added: core-and-shell rubbers having a viscoplastic core of (meth)acrylate, butadiene or styrene/butadiene rubber having glass transition temperature $T_g$ of $< -10°$ C., it being possible for the core to be crosslinked. The shell can be made up unsaturated monomers which optionally carry acid or acid anhydride groups (German Offenlegungsschriften 21,44,528 and 37,28,685).

Conventional auxiliaries and additives, such as flameproofing agents, stabilizers, processing auxiliaries, viscosity improvers, fillers, pigments or the like can also be added to the invention molding compositions.

Unexpectedly, the molding compositions according to the invention are suitable as agents for imparting compatibility or promoting adhesion. Thus, by addition of the invention molding composition it is possible to produce blends of, for example, polyamide/polyester or polyamide/polycarbonate which do not have the disadvantages which usually result because of substance incompatibility. In the same way, the molding compositions according to the invention are suitable for use as an adhesion-promoting layer between, for example, polyamide/polyester layers or else polyamide/polycarbonate layers. Thus, it is possible to prepare composite materials which have an adhesive joint layer between the various bulk layers.

In order to indicate more fully the nature and utility of this invention, the following examples are provided which are provided which are illustrative only and are not intended to limit the scope of the invention.

EXAMPLES

All the results given in the examples were determined with the aid of the following measurement methods:

The determination of the solution viscosity (relative viscosity $\eta_{rel}$) of the polyamides is carried out using a 0.5% strength by weight m-cresol solution at 25° C. in accordance with DIN 53 727/ISO 307.

The determination of the solution viscosity (coefficient of viscosity J) of the polyesters is carried out in a 0.5% strength by weight phenol/o-dichlorobenzene solution (weight ratio: 1:1) at 25° C. in accordance with DIN 53 728/ISO 1628 - Part 5.

For determination of the amino end groups 1 g of Component A is dissolved in 50 ml of m-cresol at 25° C. The solution is titrated potentiometrically with perchloric acid.

For determination of the carboxyl end groups in Component A and B, 1 g of polycondensation product is dissolved in 50 ml of benzyl alcohol under blanketing with nitrogen at 165° C. The time taken for dissolution is at most 20 min. The solution is titrated with a solution of KOH in ethylene glycol (0.05 mol KOH/l) against phenolphthalein to the color change.

Testing of the mechanical separability at the interface is carried out using a metal wedge (edge angle: 5 degrees; load weight: 2.5 kg), an attempt being made to separate the material interface to be tested. If separation takes place at the boundary between the components, the adhesion is poor. If, on the other hand, separation takes place entirely or partially within one of the two components, the adhesion is good.

A. Component A

A1: Polyamide 12 ($\eta_{rel}$: 1.91; content of amino end groups: 58 mmol/kg; content of carboxyl end groups 11 mmol/kg)

A2: Polyamide 12 ($\eta_{rel}$: 1.66; content of amino end groups: 48 mmol/kg; content of carboxyl end groups 52 mmol/kg)

A3: Polyamide 612 ($\eta_{rel}$: 1.94; content of amino end groups: 75 mmol/kg; content of carboxyl end groups 33 mmol/kg)

A4: Polyamide 66 ($\eta_{rel}$: 1.91; content of amino end groups: 72 mmol/kg; content of carboxyl end groups 43 mmol/kg)

B. Component B

B1: Homopolybutylene terephthalate (coefficient of viscosity J: 169 cm$^3$/g; content of carboxyl end groups: 40 mmol/kg)

B2: Homopolybutylene terephthalate (coefficient of viscosity J: 147 cm$^3$/g; content of carboxyl end groups: mmol/kg)

B3: Homopolybutylene terephthalate (coefficient of viscosity J: 108 cm$^3$/g; content of carboxyl end groups: mmol/kg)

C. Component C

C1: 2,2'-p-Phenylene-bis-(2-oxazoline)
C2: 2,2'-m-Phenylene-bis-(2-oxazoline)
C3: 2,2'-(1,4-Cyclohexylidene)-bis-(2-oxazoline)

Preparation of the Molding Compositions According to the invention

Experiment 1

20 kg of B2 and 0.24 kg of C2 are melted in a Berstorff ZE 40 twin-screw extruder at a cylinder temperature of 250° C., a mass throughput of 40 kg/h and a speed of rotation of the screws of 300 min$^{-1}$. In a second extrusion step, 10 kg of this modified polybutylene terephthalate are melt-mixed with 10 kg of A1 at a cylinder temperature of 250° C., a mass throughput of 40 kg/h and a speed of rotation of the screws of 250 min$^{-1}$.

Experiment 2

20 kg of B2 and 0.24 kg of C1 are melted in a Berstorff ZE 40 twin-screw extruder at a cylinder temperature of 250° C., a mass throughput of 40 kg/h and a speed of rotation of the screws of 300 min$^{-1}$. In a second extrusion step, 11 kg of this modified polybutylene terephthalate are melt-mixed with 9 kg of A1 at a cylinder temperature of 250° C., a mass throughput of 40 kg/h and a speed rotation of the screws of 250 min$^{-1}$.

Experiment 3

3 kg of B1 and 0.018 kg of C2 are melted in a Leistriz LSM 30.34 twin-screw extruder at a cylinder temperature of 245° C., a mass throughput of 4 kg/h and a speed of rotation of the screws of 60 min$^{-1}$. In a second extrusion step, 1.5 kg of this modified polybutylene terephthalate are melt-mixed with 1.5 kg of A1 at a cylinder temperature of 270° C., a mass throughput of 3 kg/h and a speed of rotation of the screws of 100 min$^{-1}$.

Experiment 4

3 kg of B1 and 0.048 kg of C2 are melted in a Leistriz LSM 30.34 twin-screw extruder at a cylinder temperature of 245° C., a mass throughput of 4 kg/h and a speed of rotation of the screws of 60 min$^{-1}$. In a second extrusion step, 1.5 kg of this modified polybutylene terephthalate are melt-mixed with 1.5 kg of A1 at a cylinder temperature of 270° C., a mass throughput of 3 kg/h and a speed of rotation of the screws of 100 min$^{-1}$.

Experiment 5

3 kg of B1 and 0.048 kg of C2 are melted in a Leistriz LSM 30.34 twin-screw extruder at a cylinder temperature of 245° C., a mass throughput of 4 kg/h and a speed of rotation of the screws of 60 min$^{-1}$. In a second extrusion step, 2.8 kg of this modified polybutylene terephthalate are melt-mixed with 1.2 kg of A1 at a cylinder temperature of 250° C., a mass throughput of 4 kg/h and a speed of rotation of the screws of 75 min$^{-1}$.

Experiment 6

3 kg of B2 and 0.036 kg of C2 are melted in a Leistriz LSM 30.34 twin-screw extruder at a cylinder temperature of 250° C., a mass throughput of 5 kg/h and a speed of rotation of the screws of 100 min$^{-1}$. In a second extrusion step, 1.5 kg of this modified polybutylene terephthalate are melt-mixed with 1.5 kg of A2 at a cylinder temperature of 250° C., a mass throughput of 4 kg/h and a speed of rotation of the screws of 200 min$^{-1}$.

Experiment 7

3 kg of B3 and 0.048 kg of C2 are melted in a Leistriz LSM 30.34 twin-screw extruder at a cylinder temperature of 250° C., a mass throughput of 5 kg/h and a speed of rotation of the screws of 100 min$^{-1}$. In a second extrusion step, 2.8 kg of this modified polybutylene terephthalate are melt-mixed with 1.2 kg of A1 at a cylinder temperature of 250° C., a mass throughput of 4 kg/h and a speed of rotation of the screws of 100 min$^{-1}$.

Experiment 8

3 kg of B1 and 0.036 kg of C2 are melted in a Leistriz LSM 30.34 twin-screw extruder at a cylinder temperature of 250° C., a mass throughput of 4 kg/h and a speed of rotation of the screws of 100 min$^{-1}$. In a second extrusion step, 2 kg of this modified polybutylene terephthalate are melt-mixed with 2 kg of A3 at a cylinder temperature of 250° C., a mass throughput of 4 kg/h and a speed of rotation of the screws of 200 min$^{-1}$.

Experiment 9

3 kg of B3 and 0.048 kg of C2 are melted in a Leistriz LSM 30.34 twin-screw extruder at a cylinder temperature of 250° C., a mass throughput of 4 kg/h and a speed of rotation of the screws of 100 min$^{-1}$. In a second extrusion step, 2.8 kg of this modified polybutylene terephthalate are melt-mixed with 1.2 kg Of A4 at a cylinder temperature of 260° C., a mass throughput of 4 kg/h and a speed of rotation of the screws of 200 min$^{-1}$.

Experiment 10

3 kg of B1 and 0.036 kg of C3 are melted in a Leistriz LSM 30.34 twin-screw extruder at a cylinder temperature of 250° C., a mass throughput of 4 kg/h and a speed of rotation of the screws of 100 min$^{-1}$. In a second extrusion step, 2 kg of this modified polybutylene terephthalate are melt-mixed with 2 kg of A1 at a cylinder temperature of 250° C., a mass throughput of 4 kg/h and a speed of rotation of the screws of 200 min$^{-1}$.

Comparative Examples Outside the Scope of the Present Invention

Experiment A 20 kg of B2 are melted with 20 kg of A1 in a Berstorff ZE 40 twin-screw extruder at a cylinder temperature of 250° C., a mass throughput of 40 kg/h and a speed of rotation of the screws of 300 min$^{-1}$.

Experiment B 2 kg of B1 are melted with 2 kg of A1 in a Leistriz LSM 30.34 twin-screw extruder at a cylinder temperature of 250° C., a mass throughput of 4 kg/h and a speed of rotation of the screws of 100 min$^{-1}$.

Experiment C 2 kg of B3 are melted with 2 kg of A3 in a Leistriz LSM 30.34 twin-screw extruder at a cylinder temperature of 250° C., a mass throughput of 4 kg/h and a speed of rotation of the screws of 100 min$^{-1}$.

Assessment of the Molding Compositions as Agents for Imparting Compatibility To determine their suitability as agents for imparting compatibility, the appearance of the billet and the tendency to delaminate after stretching is visually assessed. Incompatible polycondensation product mixtures can be drawn off as a billet only with difficulty, since they show a severe widening of the billet. The lack of compatibility between the components of the polycondensation product is evident from a strong tendency to delaminate, in particular after stretching of a billet. Reduced delamination, or lack of delamination, is therefore regarded as a measure of the compatibility-imparting effect of the molding compositions according to the invention.

TABLE 1

| Experiment | Billet Widening | Delamination After Stretching |
|---|---|---|
| Experiment 1 | none | none |
| Experiment 2 | none | none |
| Experiment 3 | none | none |
| Experiment 4 | none | none |
| Experiment 5 | none | none |
| Experiment 6 | none | none |
| Experiment 7 | none | none |
| Experiment 8 | none | none |
| Experiment 9 | none | none |
| Experiment 10 | none | none |
| Experiment A | severe | severe |
| Experiment B | severe | severe |
| Experiment C | moderate | moderate |

Assessment of the Molding Compositions as Adhesion Promoters

The suitability of the invention molding compositions as adhesion promoters is determined on polyamide/polyester multilayer composites. The multilayer composites are produced as follows:

Components A and B are first individually processed to give pressed sheets about 1 mm thick (pressing time: 10 min; pressing temperature: 10° C. above the melting or softening point). No mould release agents of any type are used. An interlayer material according to above Experiments 1–10 is placed between the pressed sheets and the entire composition is pressed to give a multilayer composite. The pressing temperature for this operation depends on the material having the highest melting or softening point. The pressing time is 10 min.

TABLE 2

| Experiment | Layer A | Layer B | Interlayer According to Experiment | Mechanically Separable at Interfaces |
|---|---|---|---|---|
| 11 | A1 | B1 | 1 | no |
| 12 | A1 | B1 | 2 | no |
| 13 | A1 | B1 | 3 | no |
| 14 | A1 | B1 | 4 | no |
| 15 | A1 | B1 | 5 | no |
| 16 | A1 | B1 | 6 | no |
| 17 | A1 | B1 | 7 | no |
| 18 | A3 | B2 | 8 | no |
| 19 | A4 | B1 | 9 | no |
| 20 | A1 | B1 | 10 | no |

As shown in Table 2 above, the invention molding compositions provide excellent adhesion between polyamide and polyester sheets.

While the present invention has been described in terms of its specific embodiments, certain modifications and equivalents will be apparent to those skilled in the art and are intended to be included within the scope of the present invention, which is to be limited only by scope of the appended claims.

We claim:

1. A molding composition comprising a polycondensation product of
   A. 0.9 to 99% by weight of a wholly aliphatic polyamide
   B. 99 to 0.9% by weight of a linear, crystalline polyester and
   C. 0.1 to 10% by weight of a compound of the formula (A)

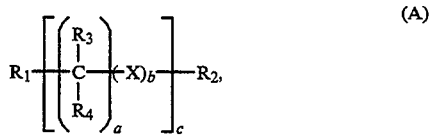

in which $R_1$ and $R_2$, which may be the same or different, denote:

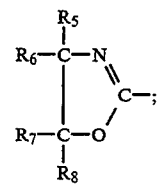

$R_3$ to $R_8$ denote —H or an aliphatic or cycloaliphatic $C_{1-12}$ radical, it being possible for $R_3$ to $R_8$ to be identical to or different from one another;

x denotes an aromatic $C_{6-12}$ diradical or a cycloaliphatic $C_{3-12}$ diradical, a denotes 0 to 12;

b denotes 0 or 1 and c denotes 0 or 1.

2. A molding composition according to claim 1, characterized in that it comprises a polycondensation production of
   A. 29.5 to 70% by weight of a wholly aliphatic polyamide,
   B. 70 to 29.5% by weight of a linear, crystalline polyester and
   C. 0.5 to 5% by weight of a compound of the formula (A).

3. A molding composition according to claim 1 characterized in that Component C of the polycondensation product has the following structure:

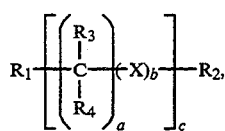

in which
R₁ and R₂ denote:

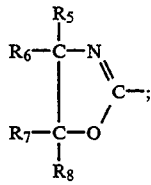

R₃ to R₈ denote —H;
x denotes

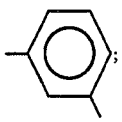

a denotes 0; and
b=c=1.

4. A molding composition according to claim 1 characterized in that Component C of the polycondensation product has the following structure:

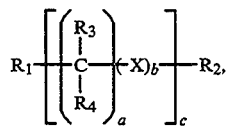

in which
R₁ and R₂ denote

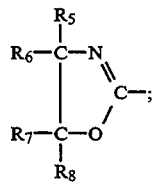

R₃ to R₈ denote —H;
a denotes 6;
b denotes 0;
c denotes 1.

5. A molding composition according to claim 1 characterized in that Component C of the polycondensation product has the following structure:

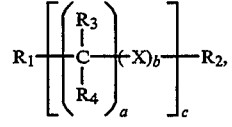

in which
R₁ and R₂ denote

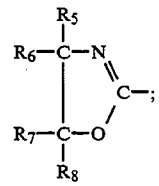

R₃ to R₈ denote —H;
x denotes

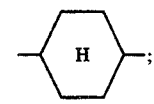

a denotes 0; and
b=c=1.

6. A molding composition according to claim 1 characterized in that Component C is 2,2'-m-phenylene-bis-(2-oxazoline).

7. A molding composition according to claim 1 characterized in that Component C represents 1,4-cyclohex-ylidene-bis-(2-oxazoline).

8. A molding composition comprising a polycondensation product of
   A. 0.9 to 99% by weight of a wholly aliphatic polyamide selected from the group consisting of at least one of b, c and d
     (a) homo-polycondensation polyamides,
     (b) copolyamides,
     (c) poly(ether esteramides) and
     (d) poly(ether amides),
   wherein said copolyamides are prepared from a co-acid selected from the group consisting of adipic acid and suberic acid and a co-diamine selected from the group consisting of bis(4'-aminocyclohexyl)methane, trimethylhexamethylene diamine and hexamethylene diamine,
   B. 99 to 0.9% by weight of a linear, crystalline polyester and
   C. 0.1 to 10% by weight of a compound of the formula (A)

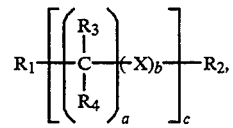

in which R₁ and R₂, which may be the same or different, denote:

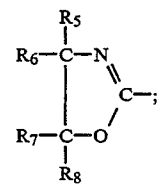

R₁ to R₈ denote —H or an aliphatic or cycloaliphatic C₁₋₁₂ radical, it being possible for R₃ to R₈ to be identical to or different from one another;
   x denotes an aromatic C₆₋₁₂ diradical or a cycloaliphatic C₃₋₁₂ diradical,
   a denotes 0 to 12;
   b denotes 0 or 1 and
   c denotes 0 or 1.

* * * * *